Feb. 2, 1965  W. D. BAILEY  3,167,859
METHOD OF PRODUCING SHOULDERED SLEEVES AND SIMILAR ARTICLES
Filed Dec. 15, 1958  2 Sheets-Sheet 1

INVENTOR
William D. Bailey
BY
ATTORNEYS

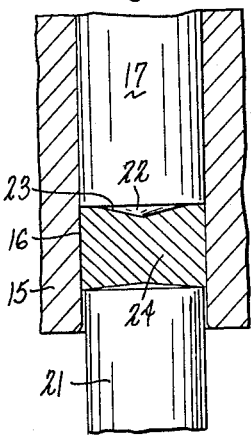
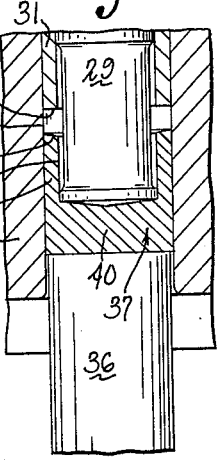
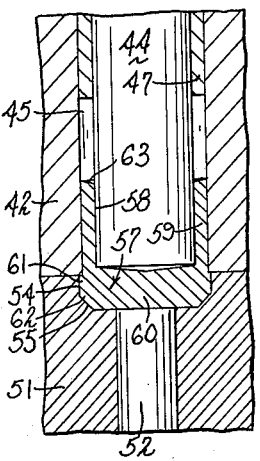
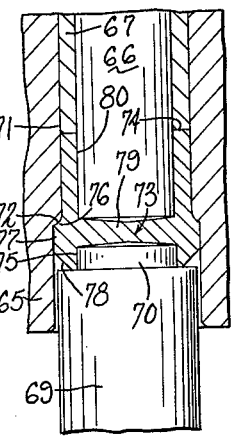
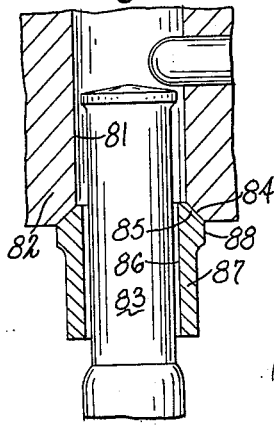
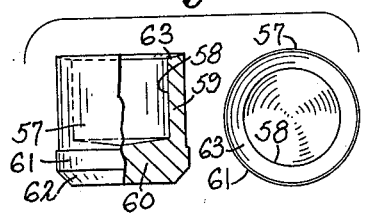
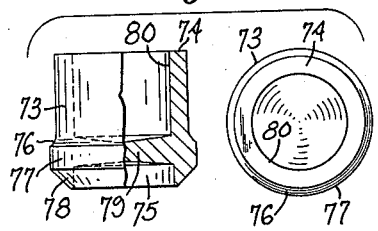
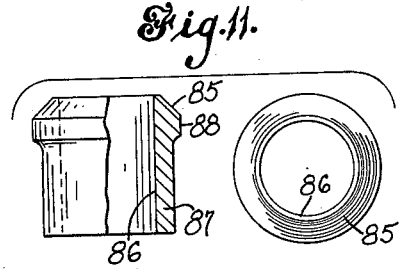

United States Patent Office 3,167,859
Patented Feb. 2, 1965

3,167,859
METHOD OF PRODUCING SHOULDERED SLEEVES AND SIMILAR ARTICLES
William D. Bailey, Cheshire, Conn., assignor to Textron Inc., Providence, R.I., a corporation of Rhode Island
Filed Dec. 15, 1958, Ser. No. 780,304
2 Claims. (Cl. 29—539)

This invention relates to a method of producing thin shouldered sleeves and similar articles, particularly cylindrical sleeve-like members having relatively thin walls and exterior shoulders formed thereon, usually adjacent one end of the part.

Items of this character have in the past usually been formed from bar stock upon automatic screw machines. However, such a method of manufacture has been relatively slow and results in considerable waste in that there is substantial loss of material in scrap.

It is contemplated by the present invention to provide a method of forming articles of the character described by successive punch and die operations by the same machine, the method being a cold forming one in that no heat is applied to the blank prior or during the operation except, of course, that which may be generated by the flow of the metal. In the present method of manufacture a workpiece is cut from a bar or rod stock and this workpiece is extruded around a forming pin to make a cup-shaped article having a relatively thick bottom wall at one end. This bottom wall is then indented and thereafter the material between the bottom of this indentation and the bottom of the cup-shaped portion of the member is pierced out, thus forming a sleeve-like member.

In the process of forming the cup-shaped member the metal is extruded over and around a fixed pin or punch in a die and a knock-out sleeve surrounding this pin is then advanced to eject the blank from the die. This sleeve, however, does not contact the upper edge of the skirt portion of the blank so that no pressure is taken against the comparatively thin wall of this sleeve. The sleeve can, therefore, be made relatively thin although it is strong enough to serve as a knock-out sleeve and, therefore, the blank itself may have a relatively thin wall as it, of course, occupies the space between the pin and the die. The extruding pressure and heading pressure to form the shoulder on the blank are borne by the back pin or pin over which the blank is extruded.

It has been found that by the present method it is possible to produce a sleeve-like member having an exterior shoulder with a small material loss at a relatively high production rate and with accurate dimensions and excellent finish.

One object of the invention is to provide a method of forming tubular or sleeve-like parts having relatively thin walls and, if desired, an exterior shoulder adjacent one end of the blank.

Still another object of the invention is to provide a method for forming metallic sleeve-like or tubular members having an external shoulder thereon by extruding such members over a fixed back pin within a die, preferably a sliding die, and ejecting the blank from the die by an ejecting sleeve embracing the pin.

Still another object of the invention is to provide a method of the character described above wherein the pressure of the extruding- and shoulder-forming operations is borne by the back pin or pin over which the blank is extruded and the knock-out sleeve is relieved of any such pressure.

To these and other ends the invention consists in the novel features and combinations of parts to be hereinafter described and claimed.

In the accompanying drawings:

FIG. 2 is an enlarged sectional view showing the tooling employed at the first station of the machine;

FIG. 3 is an enlarged sectional view showing the tooling employed at the second station of the machine;

FIG. 4 is an enlarged sectional view showing the tooling employed at the third station of the machine;

FIG. 5 is an enlarged sectional view showing the tooling employed at the fourth station of the machine;

FIG. 6 is an enlarged sectional view showing the tooling employed at the fifth station of the machine;

FIG. 7 shows the blank in side elevational view, partly in section and plan view, after the operation performed at the first station;

FIG. 8 shows the blank in side elevational view, partly in section and plan view, after the operation performed at the second station;

FIG. 9 shows the blank in side elevational view, partly in section and plan view, after the operation performed at the third station;

FIG. 10 shows the blank in side elevational view, partly in section and plan view, and after the operation performed at the fourth station; and FIG. 11 shows the blank in side elevational view, partly in section and plan view, after the operation performed at the fifth station.

Figure 1:
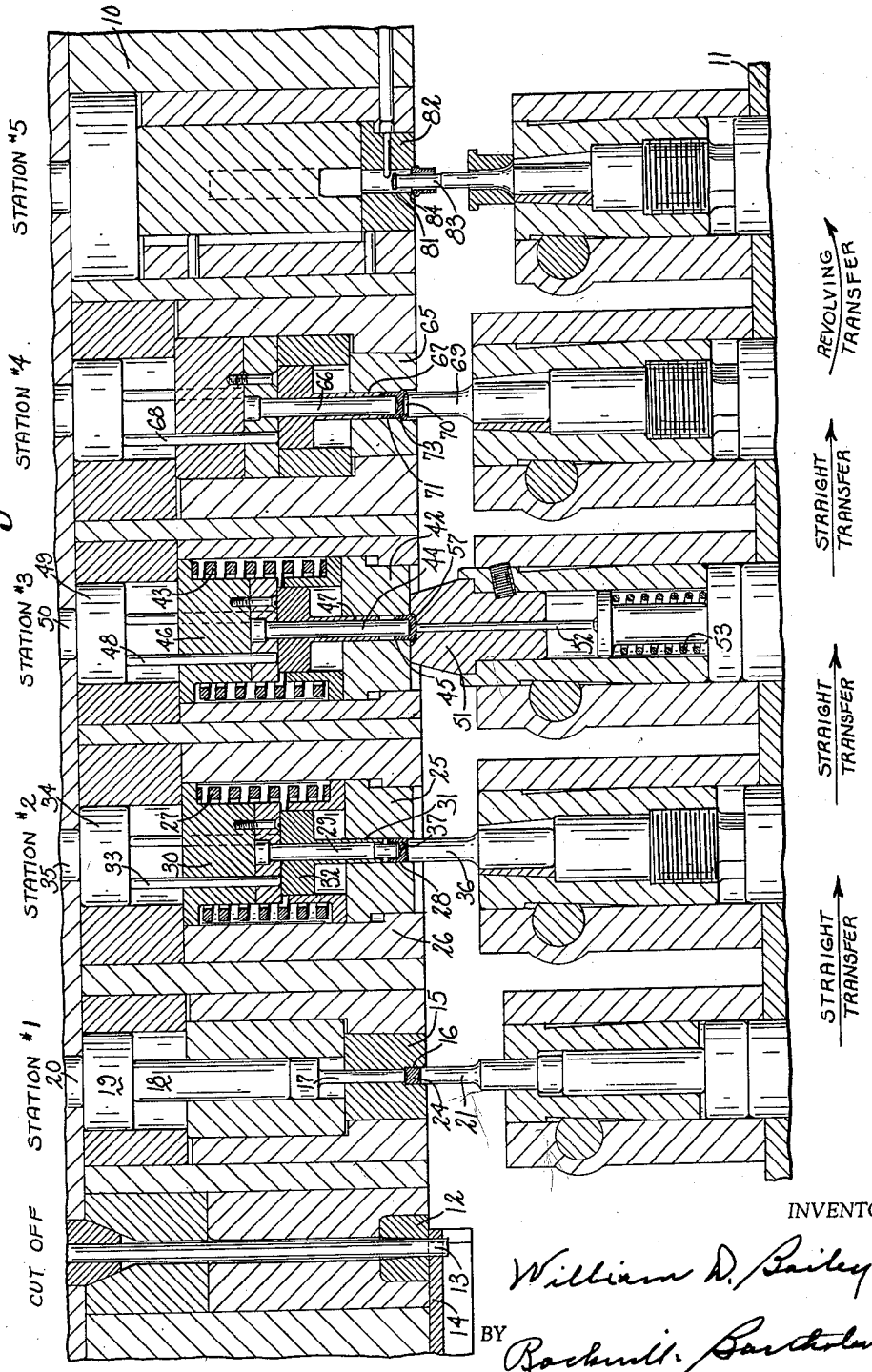
FIG. 1 is a sectional view of an apparatus provided with tools embodying the invention.

To illustrate one embodiment of the invention there is shown a parts-forming or cold-heading apparatus comprising a die bed 10 having a plurality of die stations therein, reference to which will be made hereafter, and a gate 11 carrying a plurality of punches. It will be understood that as is usual the die bed is fixed upon the frame of the machine and the gate 11 is reciprocated so as to move the punches toward the dies. When the gate is retracted the workpieces or blanks are transferred by suitable transfer means from one die station to the next. As such means is well known in the art, illustration thereof is unnecessary.

As illustrated, a cut-off die 12 is mounted in the die bed through which a length of stock 13 is fed from which is cut a suitable length by the knife 14 to serve as a workpiece. Usually the knife is reciprocable and serves to carry the workpiece to the first station of the machine opposite the die opening therein so that it may be pushed into the die opening for the first working operation. As illustrated, a die 15 having an opening 16 is mounted in the die bed at the first station, the rear end of the opening in the die being closed by a knock-out pin 17 against which abuts a rod 18 backed by a plug 19 which is actuated by the knock-out rod 20. The knock-out rod 20 is operated from the machine in the manner usual in progressive headers. A punch 21 is provided in the gate 11 to engage the workpiece and move it into the die against the pin 17.

As shown in FIG. 2, the pin 17 may be provided with a relatively flat coned end 22 which, as shown in FIGS. 2 and 7, serves to form an indentation 23 in the rear face of the blank 24 which is also squared at this station and enlarged in diameter compared to that of the rod 13.

The blank is then transferred to the second working station in the machine where a die 25 is slidably mounted in a die holder 26 in the die bed, this die being urged forwardly by the spring 27, its outer position being limited by cooperating shoulders provided on the die holder and die. This die is provided with an opening 28 within which is a back pin or extruding pin 29 held in a fixed position in the die by the block 30. The pin 29 is embraced by a knock-out sleeve 31 having a head 32 which is engaged by a plurality of pins 33 slidably mounted in the block 30. The pins 33 are backed by a plug 34 which is actuated by a knock-out rod 35 from the machine in the usual manner.

At station No. 2 a pin punch 36 is secured in the gate and this punch serves to pick up the squared workpiece delivered from the first station and force it into the die opening. Due to the fact that the die 25 occupies an outer position, relative to that shown in FIG. 1, wherein its forward face is flush with the face of the die holder 26, the squared blank is completely enclosed in the die opening 28 by the advancing punch before pressure is applied thereto. Upon continued movement of the punch, the die and blank will be moved rearwardly and the metal of the blank is extruded about the end of the back pin 29 so that the skirt or wall portion of the blank occupies the space between this pin and the wall of the die opening.

As shown in FIG. 8, the workpiece 37, after the operation at station No. 2, is of cup-shaped form, having a relatively deep opening 38 therein and a relatively thin wall 39 with a relatively heavy base or bottom portion 40. As will be noted from FIG. 3, the outer end of the knock-out sleeve 31 does not make contact with the upper end of the skirt portion of the blank but is spaced therefrom, as shown at 40a (FIG. 3), so that none of the extruding pressure will be borne by this sleeve, the pressure being taken by the back pin 29. It may also be noted that the metal at the rear end of the skirt portion of the blank is slightly sucked in toward the opening 38 so as to leave a beveled edge 41.

After this operation has been performed, the gate is withdrawn and the knock-out rod 35 is advanced, thus advancing the knock-out sleeve 31 and ejecting the blank from the die opening into the fingers of suitable transfer mechanism for transfer to the next working station.

At this third station a die 42 is slidably mounted in the die bed and urged forwardly by the spring 43 similarly to the arrangement at the second station. Also a back pin or extruding pin 44 is held in fixed position within the die opening 45 by a backing block 46, and a knock-out sleeve 47 surrounds the pin 44 and is moved forwardly by pins 48 which are backed by a plug 49 actuated by the knock-out rod 50.

A nose punch 51 is employed at the third station and within this punch is slidably mounted a pin 52 urged outwardly by the spring 53. The nose punch, as shown more particularly in FIG. 4, is provided with a cavity 54 to receive the outer portion of the blank, the lower portion of the wall of this cavity being beveled, as shown at 55, and the cavity being slightly larger than the opening 45 in the die to provide an exterior shoulder on the blank to be hereinafter referred to. Here again the knock-out sleeve 47 is of such dimensions that it will not make contact with the rear edge of the skirt portion of the blank, the entire pressure necessary to extrude and form the shoulder on the blank being borne by the forming or back pin 44.

When the blank has been transferred to the third station and the gate advances, the pin 52 which is urged outwardly by the spring 53 engages the blank and pushes it into the die cavity 45. As the punch 51 advances, it completely encloses the blank within the die cavity and the cavity 54 in the punch before any pressure is applied to the blank. Upon further advance of the gate and punch 51, the blank together with the die 42 is moved inwardly and the blank is further extruded about the back pin 44 which, as previously described, is held in a fixed position in the die bed.

After the completion of the operation shown at station No. 3, the blank is in the form shown at 57 in FIG. 9. The recess 58 has been deepened and the wall 59 is somewhat thinner than that formed at the previous station and also longer, and the bottom 60 is of less thickness. A shoulder 61 is formed exteriorly on the lower portion of the blank by reason of the fact that the cavity or recess 54 in the punch is of somewhat larger diameter than the opening 45 in the die. Below the shoulder 61 the blank is beveled, as shown at 62, by reason of the bevel 55 in the punch 51. The rear or outer end of the skirt portion is also slightly beveled, as shown at 63, due to the fact that it is not engaged by the knock-out sleeve 47.

After the operation has been performed at station No. 3, the sleeve 47 is advanced to eject the blank from the die 42 into the transfer fingers, not shown, which carry it to the fourth station of the machine where tools are provided to indent the forward end of the blank and also to bring it to finished size. At this station a fixed die 65 is provided in the die bed together with a fixed forming pin 66 and a knock-out sleeve 67 arranged to be advanced by the pins 68 as previously described in connection with stations Nos. 2 and 3. At this station a punch 69 mounted in the gate is provided with an indenting tip 70 adapted to indent the base of the blank, and the opening 71 in the die 65 is provided with a fillet 72 above the enlarged or shouldered portion of the blank.

When the gate is advanced, the punch 69 drives the blank into the die opening 71 and forms it into the shape shown at 73 of FIG. 10 in cooperation with the pin 66 and knock-out sleeve 67. In this instance the outer end of the knock-out sleeve engages the inner end of the sleeve portion of the blank with relatively light pressure to square it or flatten it as shown at 74. The outer face of the blank is indented by the punch, as shown at 75, and a fillet 76 may be formed just above the external shoulder 77, the outer bevel 78 being retained. A relatively thin web of material 79 remains between the indentation 75 and the interior 80.

When the gate has been retracted the blank is ejected by the ejecting sleeve 67 and is carried by the transfer mechanism to the fifth or piercing station of the machine. During this transfer the blank will be rotated through 180 degrees or turned end for end by well-known mechanism and pushed in front of the opening 81 of a piercing die 82 mounted in the die bed 10. A piercing punch 83 carried by the gate is driven into the cavity 80 as the gate advances to pierce the web 79 from the blank in the usual manner.

As may be noted from FIG. 6, the opening 81 of the die 82 is beveled adjacent its outer end as at 84 so as to retain the bevel 78 previously formed on the blank. The engagement of the bevel 78 with the bevel 84 of the die bears the pressure exerted by the piercing punch. This pressure evens out the bevel 78 to the finished required angle shown upon the finished article at 85 (FIG. 11).

The blank as completed has a through opening 86 and relatively thin walls 87 with the external shoulder 88. Moreover, by forming the blank in this manner the finished item is of accurate dimensions made to close tolerances, possesses an excellent finish, and is made with small loss of material in scrap, the only loss being that occasioned by the piercing out of the web 79.

While there has been shown and described one embodiment of the invention and a method of carrying out the improved process, it will be understood that the invention is not to be limited to all of the details shown or all of the steps described in detail, but is capable of modification and variation within the spirit of the invention and within the scope of the claims.

What is claimed is:

1. The method of making a thin-walled sleeve-like metal article having an external shoulder thereon comprising:

(a) cutting a workpiece from a length of solid metal stock, (b) confining the workpiece by the action of an advancing punch in a die having a substantially uniform cross-sectionl opening and having a pin of smaller cross-sectional size than the die opening extending into the die opening from the rear thereof said die being slidable with respect to said pin, (c) advancing the punch and die relatively to the pin to force the workpiece over the pin and extrude the metal rearwardly into the void around the pin whereby a cup-shaped blank is formed, (d) confining the blank within a recess in the face of a second advancing punch and in a second die having a substantially uniform cross-sectional opening and having a second pin of smaller cross-sectional size than the die opening extending into the die opening from the rear thereof and being slidable with respect thereto, and (e) advancing the last-named punch and die relatively to the pin to force the blank over the pin and further extrude and lengthen the wall of the cup-shaped blank into the void around the pin and, at the same time, form a shoulder on the blank having an annular bevelled surface adjacent the outer end thereof by means of the recess in the punch while holding the pin against movement to cause it to bear the pressure exerted by the punch on the blank, whereby a blank is formed having a hollow, elongated thin-walled skirt portion extending from a base having an external shoulder thereon.

2. The method of making a thin-walled sleeve-like metal article having an external shoulder thereon comprising:

(a) cutting a workpiece from a length of solid metal stock, (b) confining the workpiece by the action of an advancing punch in a die having a substantially uniform cross-sectional opening and having a pin of smaller cross-sectional size than the die opening extending into the die opening from the rear thereof, said die being slidable with respect to said pin, (c) advancing the punch and die relatively to the pin to force the workpiece over the pin and extrude the metal rearwardly into the void around the pin whereby a cup-shaped blank is formed, (d) confining the blank within a recess in the face of a second advancing punch and in a second die having a substantially uniform cross-sectional opening and having a second pin of smaller cross-sectional size than the die opening extending into the die opening from the rear thereof, said die being slidable with respect to said pin, (e) advancing the last-named punch and die relatively to the pin to force the blank over the pin and further extrude and lengthen the wall of the cup-shaped blank into the void around the pin and, at the same time, form a shoulder on the blank having an annular bevelled surface adjacent the outer end thereof by means of the recess in the punch while holding the pin against movement to cause it to bear the pressure exerted by the punch on the blank, whereby a blank is formed having a hollow, elongated thin-walled skirt portion extending from a base having an external shoulder thereon, (f) transferring the blank to a third cooperating die and punch, (g) indenting the bottom of the cup-shaped blank to leave a relatively thin web of material between the indentation and the opening previously formed therein and, at the same time, squaring the rear edge of the extruded skirt portion, (h) transferring the blank to a fourth cooperating die and punch, and (i) piercing out the web to project an opening through the blank.

References Cited in the file of this patent
UNITED STATES PATENTS

| | | |
|---|---|---|
| 638,807 | Holinger | Dec. 12, 1899 |
| 1,158,877 | Whitaker | Nov. 2, 1915 |
| 1,774,824 | Dow et al. | Sept. 2, 1930 |
| 2,207,391 | Wilcox | July 9, 1940 |
| 2,393,850 | Wilcox | Jan. 29, 1946 |
| 2,396,995 | Friedman | Mar. 19, 1946 |
| 2,559,140 | Wilcox | July 3, 1951 |
| 2,689,359 | Friedman | Sept. 21, 1954 |
| 2,699,596 | Aronson | Jan. 18, 1955 |
| 2,953,247 | Walter et al. | Sept. 20, 1960 |